United States Patent [19]

Robinson

[11] Patent Number: 4,953,507
[45] Date of Patent: Sep. 4, 1990

[54] LIVESTOCK WATERING APPARATUS

[76] Inventor: S. Eric Robinson, R.R. 2, Wiarton, Ontario, Canada, N0H 2T0

[21] Appl. No.: 207,642

[22] Filed: Jun. 15, 1988

[51] Int. Cl.⁵ .............................................. A01K 7/00
[52] U.S. Cl. .................................................... 119/73
[58] Field of Search ....................... 119/73, 61, 62, 63, 119/74

[56] References Cited

U.S. PATENT DOCUMENTS

| | | | |
|---|---|---|---|
| 486,177 | 11/1892 | Couzens | 119/74 |
| 3,150,639 | 9/1964 | Sereda | 119/73 X |
| 3,745,977 | 7/1973 | Martin | 119/75 X |
| 4,003,340 | 1/1977 | Kuzara et al. | 119/73 |
| 4,286,546 | 9/1981 | Moore | 119/72 X |
| 4,320,720 | 3/1982 | Streed | 119/73 |
| 4,572,108 | 2/1986 | Daifotes | 119/62 X |
| 4,739,727 | 4/1988 | Boyer | 119/73 |

FOREIGN PATENT DOCUMENTS 0697114  11/1979  U.S.S.R. .................. 119/73

*Primary Examiner*—Robert P. Swiatek
*Assistant Examiner*—Todd E. Manahan
*Attorney, Agent, or Firm*—Carson, Armstrong

[57] ABSTRACT

A livestock watering device is disclosed, including an insulated tank, at least one opening through the top for an animal to gain access, and at each opening, at least one horizontally arranged buoyant door pivotally connected at one side thereof on the underside of the top adjacent to the opening, by flexible rubber straps. The upper surface of each door has a flat periphery on the hinged and adjacent sides for engaging the underside of the top of the tank adjacent the opening, and a scooped central portion falling away from the flat periphery so as to drain away from the periphery. Preferably, the flat periphery of each door lies entirely radially outwardly of the walls of the opening. A resilient seal may be added to provide a double seal. In an alternative embodiment, there are two doors per opening, the doors being pivotally connected at opposite sides of each opening and arranged to swing towards and away from each other.

5 Claims, 3 Drawing Sheets

LIVESTOCK WATERING APPARATUS

BACKGROUND OF THE INVENTION

1. Field of the Invention

This invention relates generally to livestock watering tanks and more specifically to insulated livestock watering tanks for use in particularly cold or particularly hot environments.

During winter, in cold regions such as Canada and the northern United States, it is common for the water in livestock watering tanks to freeze over. As livestock are in constant need of water, the farmer must spend a considerable amount of time ensuring that the water in the livestock watering tanks is not frozen. An insulated watering tank prevents freezing. Similarly, in hot environments, the insulated tank keeps the water relatively cool.

2. Description of the Prior Art

A number of livestock watering tanks have been proposed to overcome this problem. Examples of such tanks can be found in U.S.Pat No. 4,559,905 granted to Ahrens on Dec. 24, 1985; and U.S. Pat. No. 3,745,977 granted to Martin on Jul. 17, 1973. Both of these patents disclose insulated tanks having buoyant floats which close off the opening. The float is pushed out of the way by the animal as it drinks from the tank. The float returns to its resting position when the animal is finished drinking, thereby closing the opening. Conventional ball-cock float valves are provided in the tank to replenish the water in the tank, the valve being connected to a water supply line.

As pointed out in the introductory paragraphs of the above-mentioned Ahrens U.S. patent, conventional tanks of such a type are subject to certain problems. For example, as recited in that patent, ". . . spring-loaded doors have a tendency to close upon the head of the animal or otherwise punch the animal during drinking. Also, the buoyant floats are generally flat and can become misaligned such that the opening is not completely sealed. Also, the flat float requires the animal to exert and maintain considerable force on the float with its nose or muzzle to submerge the float to provide access to the water."

The Ahrens apparatus purports to overcome these problems, and to some extent may do so, but the Ahrens apparatus has certain problems of its own, including relative complexity of the structure.

It is also known in the prior art to have spring-loaded doors instead of buoyant floats.

Generally, the prior art devices require significant force exertion by the animal to gain access to the water, which means that smaller animals such as hogs less than 100 pounds or sheep may have difficulty in gaining access, or indeed it may be impossible for them to gain access.

In addition to the above problems, the prior art devices tend to encounter problems with the doors freezing to the tanks.

In summary, the main problems in the prior art include some or all of the following: (1) excessive force being required to gain and maintain access to the water; (2) inadequate sealing for one reason or another; and (3) freezing of the door to the surrounding tank structure.

SUMMARY OF THE INVENTION

It is an object of the present invention to provide a livestock watering tank which tends to avoid these problems of the prior art apparatus.

Thus, in accordance with the invention, there is provided a livestock watering device, including an insulated tank for receiving water from a water supply. There is at least one opening through the top for an animal to gain access to water in the tank. At each opening, there is at least one horizontally arranged buoyant door pivotally connected at one side thereof on the underside of the top adjacent to the opening, for swinging up and into or down and away from the opening. An automatic valve means responsive to the water level in the tank is provided for connection to the water supply for maintaining the water level in the tank at a level sufficient to hold each door closed by buoyancy.

In the preferred embodiment, the upper surface of each door has a flat periphery on the pivotally connected side and adjacent sides of the door for engaging the underside of the top of the tank adjacent the opening, and a scooped central portion falling away from the flat periphery so as to drain away from the periphery. A small gap into the tank is provided in the area of the lowest point of the scooped portion, so that water may drain from the top of the door into the tank.

Preferably, the flat periphery of each door lies entirely radially outwardly of the walls of the opening, or at least of any inward projections of or extensions from the walls, such that the entire portion of the door directly beneath the opening is scooped, thereby draining towards the gap.

A flexible collar or resilient sealing means may be added to further improve the sealing of the door(s).

In an alternative embodiment, there are two doors per opening, the doors being pivotally connected at opposite sides of each opening and arranged to swing towards and away from each other to close and open each opening, the upper surface of each door having a flat periphery on the pivotally connected side and adjacent sides of the door for engaging the underside of the top of the tank adjacent the opening and a scooped central portion falling away from the flat periphery so as to drain away from the periphery.

Preferably, the pivotal connection is by virtue of at least one flexible strap connected between each door and the underside of the opening, the strap providing a limited degree of freedom of lateral movement, thereby permitting the doors to self-adjust to an optimally sealed position under the force of buoyancy. Two spaced-apart straps may be used advantageously.

Further features will be described or will become apparent in the course of the following detailed description.

In the invention, relatively little force is required to gain access, since the doors swing down and away rather than just down; there is therefore not as much force of buoyancy to overcome.

Proper sealing is enhanced by the design, which provides an effective seal and which avoids problems of misalignment.

Freezing is avoided by ensuring proper drainage, and furthermore by an arrangement which permits a slow and gradual leakage of the warmer air within the tank past key freeze-prone areas.

BRIEF DESCRIPTION OF THE DRAWINGS

The preferred embodiment of the present invention will now be described in more detail with the aid of the following drawings.

DETAILED DESCRIPTION OF THE PREFERRED EMBODIMENT

Figure 1:
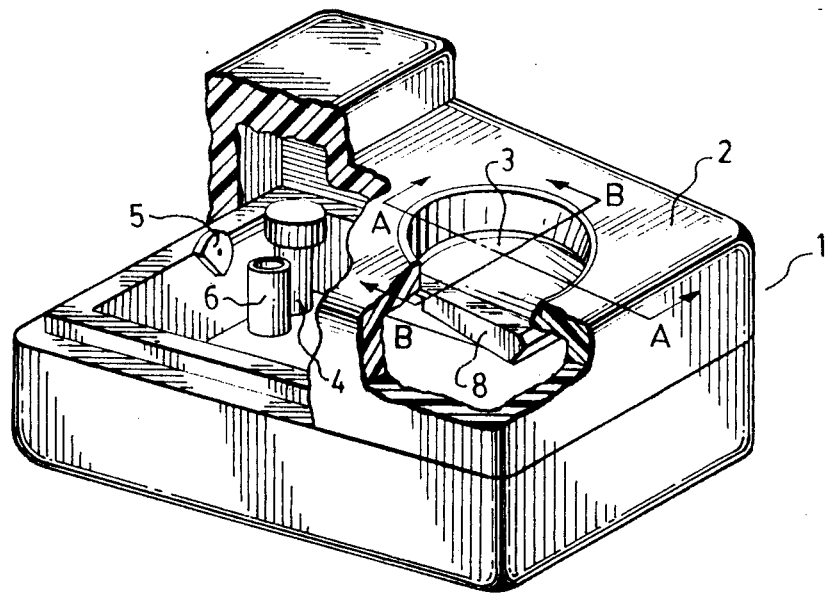
FIG. 1 is a perspective of the preferred embodiment, cut away to show portions of the interior.

Referring first to FIG. 1, the livestock watering device includes an insulated tank 1 for receiving water from a water supply (not shown). The tank is provided with an insulated cover or top 2, through which an opening 3 is provided for the animal to gain access to water in the tank. A fill valve 4 actuated by a float 5 controls the level of water in the tank, opening to add water as required. An overflow tube 6, leading to a drain, is provided. The water level is regulated to a height just below the top of the bottom section of the tank.

Figure 2:
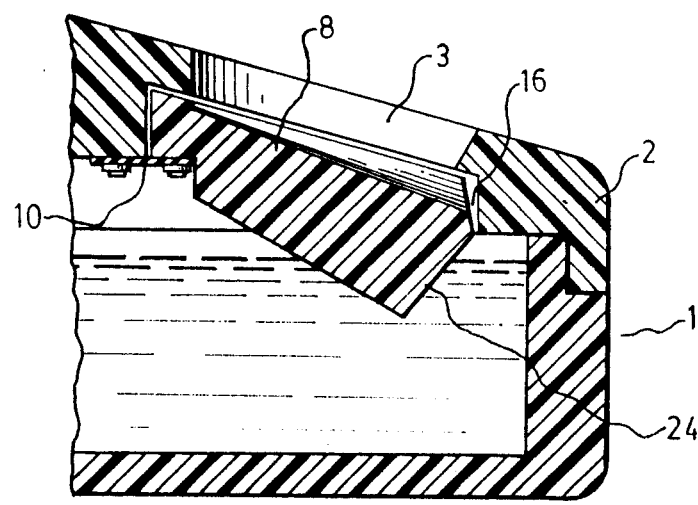
FIG. 2 is a cross-section through A—A of FIG. 1, showing the door.

As seen clearly in FIG. 2; a buoyant door 8 is positioned across the bottom of the opening. The door is mounted via two hinges 10 along one edge, preferably in the form of rubber straps, approximately 4 inches by 2 inches by ¼ inch, attached to the cover and door. The door when so mounted is able to swing down and away from the opening about the hinges. The rubber hinge arrangement provides the door with a limited degree of freedom of lateral movement, thereby permitting the doors to self-adjust to an optimally sealed position under the force of buoyancy, without need for the unit to be perfectly level. The buoyancy of the door normally forces it towards the closed position, thereby sealing off the opening. In the closed position, the water in the tank is insulated from the environment by virtue of the tank, cover and door all being insulated, preferably the insulation is achieved by virtue of the tank, cover and door being rotationally molded, with an overall thickness of approximately 4 or 5 inches, with polyurethane foam or the like then injected between the walls of the parts.

Figure 4:
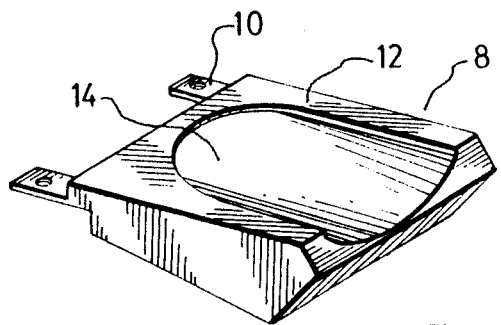
FIG. 4 is a perspective of the door.

The upper surface of the door has a flat upper periphery 12 on the hinged and adjacent sides of the door, as most clearly seen in FIG. 4. This flat periphery engages the underside of the cover adjacent the opening. A scooped central portion 14 falls away from the flat periphery so as to drain away from there. As seen in FIG. 2, a small gap 16 into the tank is provided near the lowest point of the scooped portion, so that water can drain from the top of the door into the tank. The gap 16 also allows a controlled leakage of heat from the water in the tank, slow enough to avoid having the water in the tank freeze, but sufficient to assist in preventing freezing at the door/tank interface.

Figure 3:
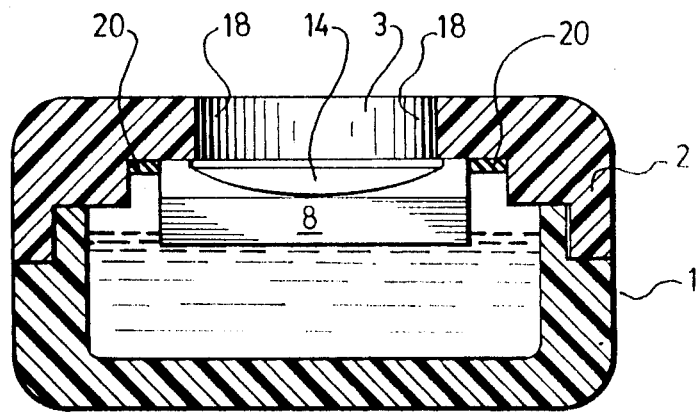
FIG. 3 is a cross-section through B—B of FIG. 1, again showing the door.

Preferably, as seen in FIG. 3, the flat periphery lies entirely radially outwardly of the side walls 18 of the opening, or at least of any extensions of or projections from the walls, such that it is set back away from the side walls of the opening and thus the entire portion of the door directly beneath the opening is scooped, thereby draining towards the gap. In the illustrated embodiments, there are no projections or extensions, but it would be possible, for example, to provide a flexible collar (not shown) which was attached to and projected inwardly from the walls to contact the upper surface of the door. In such a case, the flat periphery should be outward from the flexible collar.

The above arrangement significantly reduces any tendency for the doors to freeze, due primarily to the excellent draining and to the controlled leakage of heat, and also due to a very large extent to the fact that relatively little of the door gets actually submerged, due to being hinged at one side.

Figure 5:
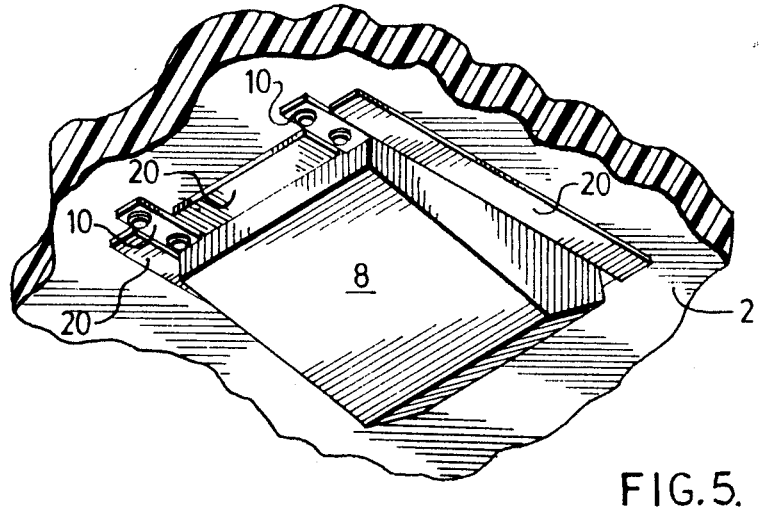
FIG. 5 is a perspective of the underside of the door, showing its attachment to the cover.

As seen in FIGS. 3 and 5, additional sealing means may be provided if desired, such as neoprene strips 20, approximately ¼ inch thick by 2 inches wide, which brush loosely against the sides of the door as it opens and closes, or in the case of the strip along the hinge side of the door, which flex with the movement of the door. Alternatively, such resilient sealing strips may be positioned around the lower edge of the opening on at least the sides of the opening corresponding to the pivotally connected and adjacent sides of the door, inward from the flat upper periphery of the door. In either case, there is an effective double seal, namely the seal between the flat upper periphery of the door and the underside of the top of the tank, and the seal between the resilient sealing means and the door.

As can be seen from FIG. 2, the door can be opened by an animal without having to push the entire door down into the water into the force of buoyancy. Only a portion of the door needs to be forced into the water, so that relatively little force is required to open the door. To enhance this characteristic, it is preferably to have the door provided with a downward projection 24, so that the hinge location can be positioned as far as practical above the water level, so that as much as possible, the door is swinging away from the opening as opposed to down from the opening.

In the embodiment shown in FIG. 1, only one door is provided. It should be readily appreciated that larger units could contain several such doors.

Figure 6:
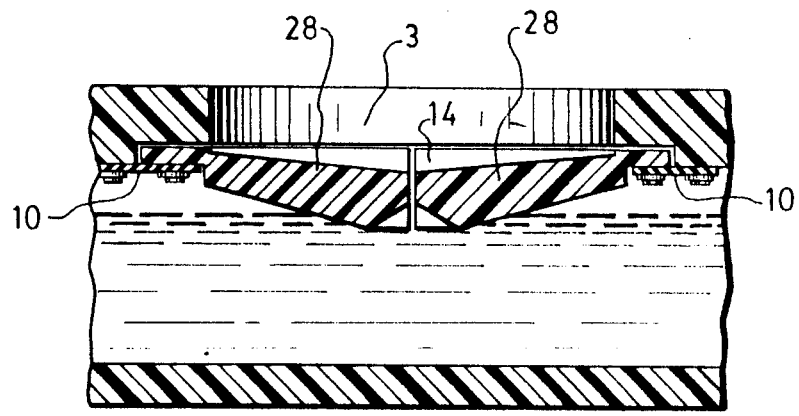
FIG. 6 is a cross-section showing an alternative door arrangement.
Figure 7:
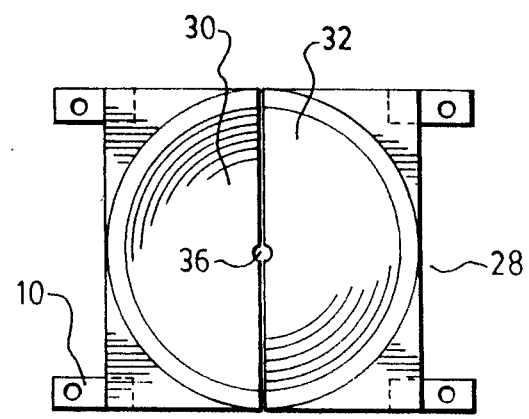
FIG. 7 is a top view of the alternative door arrangement.

Referring to FIGS. 6 and 7, an alternative embodiment is illustrated. Instead of there being a single door at each opening, double doors are provided, each door half 28 swinging down and away from the centre of the opening and down and away from each other. The door halves are mounted on flexible strap hinges 10 at opposite sides of the opening. As in the embodiments shown in FIGS. 1 through 5, the door halves are provided with flat upper peripheries 30, and with scooped central portions 32, defining a shallow conical drain down to an aperture 36 provided to allow water to drain from the surface of the door into the tank.

What I claim as my invention is:

1. A livestock watering device, comprising:
   an insulated tank for receiving water from a water supply, said tank having a bottom, a top, and sidewalls;
   at least one opening through said top whereby an animal may gain access to water in the tank;
   beneath each said at least one opening, at least one horizontally arranged buoyant door having an upper surface and an underside, said at least one door being pivotally connected at one side thereof to the underside of said top adjacent to said at least one opening, for swinging up and into or down and away from said at least one opening, the upper surface of each said at least one door having a flat periphery along the pivotally connected side and adjacent sides of the door, for engaging the underside of the top of the tank adjacent said at least one opening, and a scooped central portion falling away from said flat periphery to a low point at an edge opposite said pivotally connected side so as to drain water away from said periphery, a small gap into the tank being provided in the area of said low point of the scooped portion, whereby water may drain from the upper surface of the at least one door into said tank, said flat periphery of said at least one door being set back horizontally from said at least one opening, such that the entire portion of said at least one door directly beneath the opening is scooped and thus lower than said flat periphery, thereby draining water towards said gap; and an automatic valve means responsive to the water level in said tank for connection to said water supply for maintaining the water level in said tank at a level sufficient to hold each said at least one door closed by buoyancy.

2. A livestock watering device as recited in claim 1, in which there is only one door per opening.

3. A livestock watering device as recited in claim 1, further comprising resilient sealing means positioned around a lower edge of said at least one opening on at least those sides of said at least one opening corresponding to the pivotally connected and adjacent sides of said at least one door, adjacent to the flat upper periphery of said at least one door, thereby providing a double seal, namely a seal between the flat upper periphery of said at least one door and the underside of the top of the tank, and a seal between said resilient sealing means and said at least one door.

4. A livestock watering device as recited in claim 1, in which there are two doors per opening, the doors being pivotally connected at opposite sides of each said at least one opening and arranged to swing towards and away from each other to close and open each said at least one opening, the upper surface of each door having said flat periphery along the pivotally connected side and adjacent sides of the door for engaging the underside of the top of the tank adjacent said at least one opening and said scooped central portion falling away from said flat periphery so as to drain water away from said periphery, said scooped central portions cooperatively defining a shallow conical shape with its apex between the center of the doors, a small gap being provided at the apex of the conical shape for draining water from the upper surface of the doors into the tank, the doors being arranged to meet each other centrally as their respective flat upper peripheries come into contact with the underside of the top of the tank adjacent said at least one opening.

5. A livestock watering device as recited in claim 4, further comprising resilient sealing means positioned around a lower edge of said at least one opening on at least those sides of said at least one opening corresponding to the pivotally connected and adjacent sides of the doors, adjacent to the flat upper periphery of the doors, thereby providing a double seal, namely a seal between the flat upper periphery of the doors and the underside of the top of the tank, and a seal between the resilient sealing means and the doors.

* * * * *